United States Patent Office 3,375,216
Patented Mar. 26, 1968

3,375,216
HEAT STABILIZED AND PLASTICIZED VINYL CHLORIDE POLYMER COMPOSITIONS
Wayne E. Smith, Shawnee, Kans., and Harry D. Anspon, Kansas City, Mo., assignors to Gulf Research & Development Company, Pittsburgh, Pa., a corporation of Delaware
No Drawing. Continuation-in-part of application Ser. No. 524,488, Feb. 2, 1960. This application Feb. 2, 1966, Ser. No. 524,455
6 Claims. (Cl. 260—30.4)

This application is a continuation-in-part of copending application U.S. Ser. No. 524,488 filed Feb. 2, 1966.

This invention relates to novel and useful compositions, and more particularly to vinyl chloride polymers and conjoint plasticizers and heat stabilizers therefor.

Synthetic polymers of vinyl chloride, including homopolymers and copolymers thereof, are known and have wide industrial uses, such as coating paper and textiles, for preparing film and sheet material, and in fabrication of shaped objects by molding and the like. Many of the vinyl chloride polymers exhibit evidence of at least partial decomposition when subjected to elevated temperatures such as encountered during molding operations. Consequently, heat stabilizers are conventionally employed to stabilize the polymers somewhat against the effects of heat.

In the aforesaid copending application U.S. Ser. No. 524,488 a novel class of certain lactonized methyl propanol/methacrylic acid polymers have been disclosed and described as plasticizers for vinyl chloride polymers. It has now been discovered, in accordance with this invention, that polyvalent and particularly divalent metal salts of these lactonized methyl propanol/methacrylic acid polymers provide a conjoint function of heat-stabilization and plasticization for vinyl chloride polymers. Particularly effective conjoint heat-stabilizers and plasticizers are obtained with salts of the partially lactonized poly(methyl propanol/methacrylic acid) resins with divalent metals, and preferably with the metals of Group II of the Periodic Table. These salts will be frequently referred to for convenience, as "stabilizer/plasticizer salts."

As disclosed in the aforesaid copending U.S. Ser. No. 524,488 and comprehended in this invention, the partially lactonized methyl propanol/methacrylic acid polymers are of the type disclosed in copending application U.S. Ser. No. 466,793 filed June 24, 1965 by W. E. Smith et al., wherein they are characterized as polymers of partically lactonized poly(methyl propanol/methacrylic acid). As disclosed in copending application U.S. Ser. No. 466,793 these specific lactonized polymers are derivatives of methacrolein polymers having substantially all of the aldehyde groups of the methacrolein component reduced and oxidized to equal numbers of hydroxyl and carboxyl groups of which a portion are lactonized to provide the desired product which is substantially free of aldehyde and acetal groups. The partially lactonized poly(methyl propanol/methacrylic acid) products of this copending application U.S. Ser. No. 466,793, which are converted to the desired metal salts of this invention (for the conjoint function as heat-stabilizers and plasticizers) are those which have a molecular weight in the range of about 200 to 2,000 (preferably about 300 to about 1,000), and which contain about 20 to about 90 mole percent of monomeric lactone groups having the following structure, including mirror images thereof,

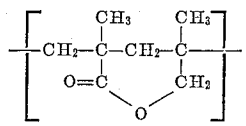

and between about 5 to about 40 mole percent, each, of monomeric methyl propanol and methacrylic acid units having, respectively, the following structures,

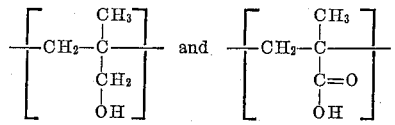

The metal salts of these partially lactonized polymers are readily prepared by heating the partially lactonized poly(methyl propanol/methacrylic acid) resin with compounds of polyvalent metals normally employed to provide conventional salts, as for example, with hydroxides, oxides such as calcium and barium oxides, and acetates such as cadmium and zinc acetates, oxalates such as stannous oxalate and the like.

The product salt of these partially lactonized poly(methyl propanol/methacrylic acid) resins obtained under moderate conditions of temperature, as for example 20 to 75° C., will be characterized as conventional salts of the resin, with the extent of the neutralization of the methacrylic acid moiety of the resin depending on the particular properties desired for the final product. Although the structure of these salts has not been definitely established, it is believed that the neutralized methacrylic acid moieties will be characterized by the structure

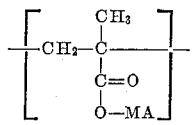

where M is a metal cation, and A is the residue of the anion moiety of the polyvalent metal employed in the reaction.

Optionally, if desired for particular applications in the final product, cross-linking may be effected between the metal salts of the partially lactonized poly(methyl propanol/methacrylic acid) resins by continuing the reaction under more severe conditions of temperatures, as for example 75 to 200° C. As above, although the structure of the cross-linked salt has not been established it is believed that the cross-linking is effected between carboxyl groups of the molecules across the polyvalent metal in a structure which may be represented as

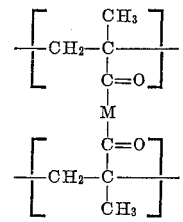

Study of the reaction also indicates that some cross-linking may be effected by means of interesterification of molecules by means of hydroxyl groups and unreacted free acid groups.

The partially lactonized poly(methyl propanol/methacrylic acid) resins comprehended for conversion to the stabilizer/plasticizer salts of this invention can be obtained by a two-stage process as disclosed in copending application U.S. Ser. No. 466,793 wherein the first stage involves the preparation of Cannizzaro-type intermediate products by reacting polymethacrolein with a strong base, such as alkali metal hydroxides, at a pH of 8 or above, in a suitable liquid medium which is preferably a solvent for the final and desired products obtained in the subsequent and second stage of the process. A typical and preferred reaction medium for the Cannizzaro-type reaction is water. The reaction is carried out at a temperature of at least about 75° C., and where a reaction medium, such as water, is used having a boiling point below 75° C., this first-stage reaction will be effected under a pressure sufficient to prevent boiling-off of the medium. It was found that this first-stage reaction must be carried out at a temperature of at least about 75° C. in order to completely convert the aldehyde and acetal groups of the base polymethacrolein to a corresponding equal number of hydroxyl and carboxylate groups, and that where lower temperatures are employed the resultant first-stage products will contain substantial quantities of residual aldehyde and acetal groups.

The poly(methyl propanol/methacrylic acid salt) products, of the first-stage Cannizzaro-type reaction, are substantially free of aldehyde and acetal groups and will contain monomeric units having the structures

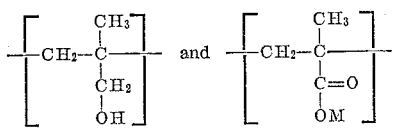

wherein M is a cation corresponding to the cation used, and will normally be a monovalent cation such as $NH_4^+$, $Na^+$, $K^+$, $Li^+$, and the like.

The second stage of the process is an acidification step which involves reacting the first-stage reaction products with a nonoxidizing mineral acid at a temperature of at least about 30° C., which normally will be about 30° C. to about 150° C., and preferably from about 30° C. to about 100° C., to lactonize adjacent hydroxyl and carboxylic acid groups. The resultant product is a terpolymer comprising a partially lactonized polymer of poly(methyl propanol/methacrylic acid) consisting essentially of from about 20 to about 90 mole percent, based on the terpolymer, of monomeric lactone groups having the structure

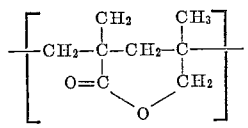

and from about 5 to about 40 mole percent each of monomeric units of methyl propanol and methacrylic acids having the following respective structures

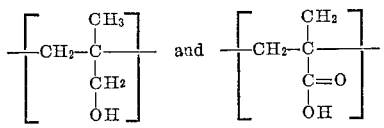

The vinyl chloride polymers comprehended in this invention include homopolymers of vinyl chloride and copolymers thereof containing in the polymer molecules between about 50 to about 100 weight percent of chemically combined vinyl chloride. Suitable comonomers capable of copolymerizing with vinyl chloride are a well known class of compounds and include, for example, vinyl esters such as vinyl acetate, acrylates such as acrylic acid esters and methacrylic acid esters, vinyl alkyl sulfonate, styrene, acrylonitrile, maleic acid and fumaric acid compounds, vinyl ethers such as vinyl ethyl ether, and the like.

The proportions of the "stabilizer/plasticizer salts" to the vinyl chloride polymers can be varied within wide limits depending on the monomers used and the desired properties of the final product. In general, about 10 to about 50 parts, and preferably about 20 to about 40 parts, by weight of the "stabilizer/plasticizer salt" will be used per 100 parts of the vinyl chloride polymer. The blending of the components can be effected by procedures well known in the art. For example, the "stabilizer/plasticizer salt" can be mixed with the vinyl chloride polymer in the desired proportions, and then thoroughly blended together by using a Banbury mixer or by forcing a melt of the mix through a compounding extruder type of mixer, with the solidified extrudate subdivided into pellet or granular form of any desired size. As will be appreciated the mix can also be blended or compounded together by means of other conventional techniques such as by milling on hot rolls or by working in a plasticator. The final blended composition may then be used for the production of various fabricated shapes and structures such as, for example, film, sheet, filaments, bars, rods, tubes, etc., in accordance with general techniques and using apparatus normally employed with conventional vinyl chloride polymers. Also it is to be understood that in addition to the primary components the compositions may include minor amounts of conventional additives normally employed in the art, as for example, additional plasticizers and stabilizers, including light stabilizers, pigments, fillers and the like.

The following examples are set forth to illustrate the invention, with all parts and percentages, unless otherwise indicated, specified as parts and percentages by weight.

*Example I*

Thirty-three parts of methacrolein was polymerized at 20 to 25° C. in 200 parts of water containing 25 parts of ethanol and 10 parts of 4% NaOH solution. After one hour the reaction was terminated and the product extracted with ethyl ether, dried over $MgSO_4$ and stripped at 100° C. and 12 mm. Hg pressure. The product polymethacrolein was a white, viscous liquid having a molecular weight of about 210.

The polymethacrolein product was converted to a water-soluble Cannizzaro-type product by reacting it with sodium hydroxide for one hour according to the following charge ratios:

|   | Parts |
|---|---|
| Polymethacrolein product | 70 |
| NaOH | 22 |
| Water | 300 |

The water-soluble Cannizzaro-type product was then acidified to a pH of 4.0 with hydrochloric acid. This final polymer product was a polymer of partially lactonized poly(methyl propanol/methacrylic acid) which separated as a second phase upon acidification, was isolated by extraction with ethyl ether and stripping at 100° C. and 12 mm. Hg pressure. The resultant product was a viscous liquid whose infra-red spectrum confirmed the presence of six-membered lactone rings.

This partially lactonized poly(methyl propanol/methacrylic acid) was substantially free of aldehyde and acetal groups, and had a melting point of −55° C., a boiling point of 261° C., and a neutralization equivalent with tetramethyl ammonium hydroxide of 3117 g./meq.

*Example II*

A "stabilizer/plasticizer salt" was prepared by mixing together 30 parts of the liquid lactonized poly(methyl propanol/methacrylic acid) of Example I with 0.272 part of calcium oxide, CaO, and heating the mixture at 150° C. for 1.5 hours. After the reaction the product was filtered to remove unreacted products, and an infra-red spectrum of the product confirmed the formation of the metal salt in the 6.4µ region.

Twenty parts of this calcium "stabilizer/plasticizer salt" was blended with 30 parts of a commercial polyvinyl chloride in a Brabender Plasticorder for five minutes at 140° C. under nitrogen. The blend was then pressed into films on a platen press at 250° F. and 4000 p.s.i. The film obtained was transparent and flexible without any sign of degradation.

*Example III*

A "stabilizer/plasticizer salt" was prepared by mixing together 30 parts of the liquid lactonized poly(methyl propanol/methacrylic acid) of Example I with 0.74 part of barium oxide, BaO, and heating the mixture at 150°

C. for 1.5 hours. After the reaction the product was filtered to remove unreacted solids, and an infra-red spectrum of the product confirmed the formation of a metal salt in the 6.4μ region.

(a) Twenty parts of this barium "stabilizer/plasticizer salt" was blended with 30 parts of a commercial polyvinyl chloride resin in a Brabender Plasticorder for five minutes at 140° C. under nitrogen. The blend was then pressed into films on a platen press at 250° F. and 4000 p.s.i. The film obtained was transparent and flexible with no indication of degradation.

(b) Part (a) of this example was repeated with the exception that 10 parts of the barium "stabilizer/plasticizer salt" of this example was blended with 30 parts of the polyvinyl chloride. A transparent and flexible film was obtained which did not exhibit any sign of degradation.

*Example IV*

A "stabilizer/plasticizer salt" was prepared by mixing together 30 parts of the liquid lactonized poly(methyl propanol/methacrylic acid) of Example I with 1.051 parts of zinc acetate, $Zn(C_2H_3O_2)_2$—$2H_2O$, and heating the mixture at 150° C. for 1.5 hours. After the reaction the product was filtered to remove unreacted solids, and an infra-red spectrum confirmed the formation of a metal salt in the 6.4μ region.

Twenty parts of the zinc "stabilizer/plasticizer salt" was blended with 30 gms. of a commercial polyvinyl chloride in a Brabender Plasticorder for five minutes at 140° C. under nitrogen. The blend was then pressed into films on a platen press at 250° F. and 4000 p.s.i. to provide a transparent and flexible film without any visible indication of degradation.

*Example V*

A "stabilizer/plasticizer salt" was prepared by mixing together 30 parts of the liquid lactonized poly(methyl propanol/methacrylic acid) of Example 1 with 0.797 part of cadmium acetate, $Cd(C_2H_3O_2)_2$—$2H_2O$, and heating the mixture at 150° C. for 1.5 hours. After the reaction the product was filtered to remove unreacted solids, and an infra-red spectrum confirmed the formation of a metal salt in the 6.4μ region.

Ten parts of the cadmium "stabilizer/plasticizer salt" was blended with 30 parts of a commercial polyvinyl chloride in a Brabender Plasticorder for five minutes at 140° C. under a nitrogen atmosphere. The blend was then pressed into films on a platen press at 250° F. and 4000 p.s.i. to provide a transparent and flexible film without any sign of degradation.

The conjoint stabilized and plasticized compositions of this invention may be used in any of the ways that the usual compositions of vinyl chloride polymers are used. Pigments, fillers, dyes and other materials may be added to obtain varied effects. The compositions may be extruded, calendered, molded or used in the form of a solution in a suitable solvent.

Although the invention has been described with reference to specific materials, embodiments and details, various modifications and changes within the scope of the invention, will be apparent to one skilled in the art and are contemplated to be embodied within the invention.

What is claimed is:

1. A composition comprising (A) a vinyl chloride polymer and (B) a stabilizer/plasticizer salt of a polymer of partially lactonized poly (methyl propanol/methacrylic acid) with a divalent metal from Group II of the Periodic Table or with tin, said partially lactonized poly (methyl propanol/methacrylic acid) having a molecular weight in the range of about 200 to about 2000, being substantially free of aldehyde and acetal groups, and containing monomeric units of the structures:

(a) 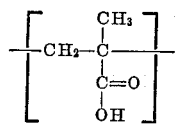

(b) 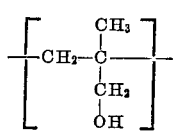

and (c) 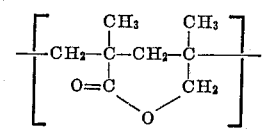

where said partially lactonized polymer contains from about 5 to about 40 mole percent each of monomeric structures (b) and (a) and about 20 to 90 mole percent monomeric structure (c).

2. The composition of claim 1 wherein the salt of said partially lactonized polymer is contained in a heat stabilizing quantity.

3. The composition of claim 1 wherein said poly(methyl propanol/methacrylic acid) is derived from a methacrolein polymer having aldehyde groups thereof reduced and oxidized to substantially equal members of hydroxyl and carboxyl groups.

4. The composition of claim 3 wherein said lactonized poly(methyl propanol/methacrylic acid) contains from about 20 to about 90 mole percent of said monomeric units having the structure

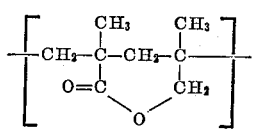

5. The composition of claim 4 wherein said lactonized poly(methyl propanol/methacrylic acid) has a molecular weight in the range of about 200 to about 2,000.

6. The composition of claim 1 wherein said composition comprises, by weight, about 10 to about 50 parts of said salt per 100 parts of said vinyl chloride polymer.

References Cited

FOREIGN PATENTS 803,053  5/1955  Canada.

MORRIS LIEBMAN, *Primary Examiner.*

R. S. BARON, *Assistant Examiner.*

UNITED STATES PATENT OFFICE
CERTIFICATE OF CORRECTION

Patent No. 3,375,216                          March 26, 1968

Wayne E. Smith et al.

It is hereby certified that error appears in the above numbered patent requiring correction and that the said Letters Patent should read as corrected below.

Column 3, lines 37 to 43, the formula should appear as shown below:

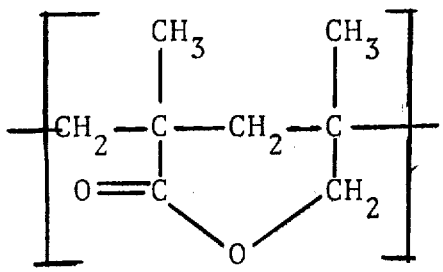

same column 3, lines 46 to 50, the formula should appear as shown below:

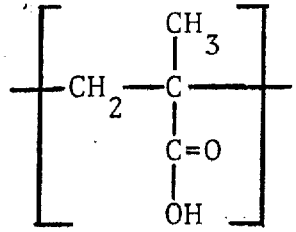

Signed and sealed this 23rd day of September 1969.

(SEAL)
Attest:

EDWARD M. FLETCHER, JR.                    WILLIAM E. SCHUYLER, JR.
Attesting Officer                             Commissioner of Patents